United States Patent [19]
Barrett

[11] 4,074,324
[45] Feb. 14, 1978

[54] INSTANT ELECTRONIC CAMERA

[76] Inventor: Jon S. Barrett, 715 Dona St., Sunnyvale, Calif. 94087

[21] Appl. No.: 595,628

[22] Filed: July 14, 1975

[51] Int. Cl.² .............................................. H04N 1/04
[52] U.S. Cl. .................................... 358/296; 358/280
[58] Field of Search ...................... 178/6.6 R; 358/296

[56] References Cited
U.S. PATENT DOCUMENTS

| 2,779,654 | 1/1957 | Williamson | 178/6.6 R |
| 3,409,904 | 11/1968 | Maiershofer | 178/6.6 R |
| 3,418,427 | 12/1968 | Jones | 178/6.6 R |
| 3,723,646 | 3/1973 | Behane | 178/6.6 R |

Primary Examiner—Thomas B. Habecker

[57] ABSTRACT

A conventional lens system projects an image on a planar array of light sensitive elements of a charge coupled device from which digital signals containing the picture information are produced and stored for reproduction by a mechanical printer.

4 Claims, 2 Drawing Figures

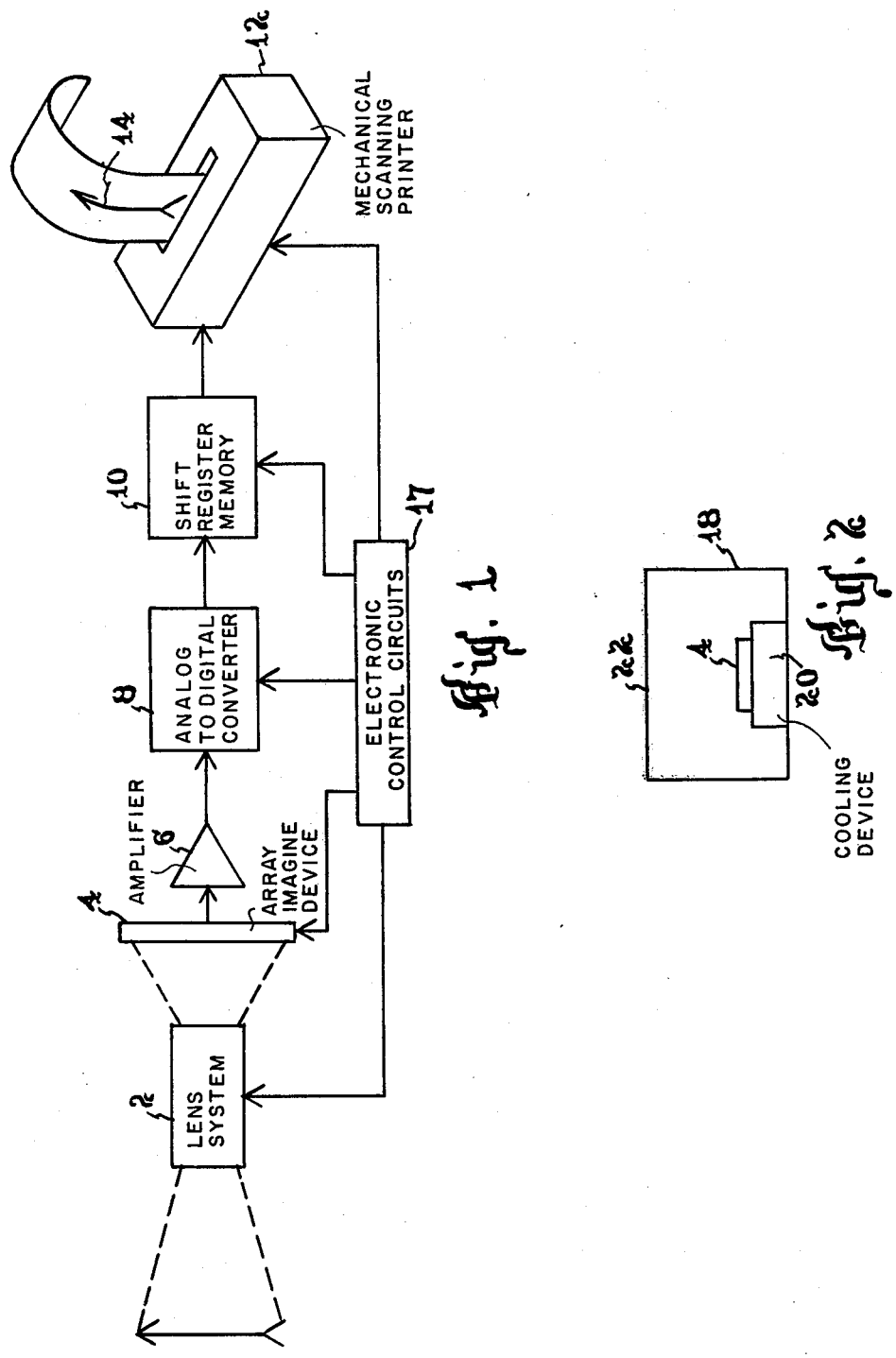

INSTANT ELECTRONIC CAMERA

This invention relates to an instantaneous camera capable of producing an immediate and permanent image on non-photographic paper. More particularly, it relates to such a camera in which a series of pulses is generated as a function of the light intensity at discrete points on an imaging device, which pulses are fed sequentially to a printer.

It is an object of this invention to provide a compact and economical camera capable of producing immediate images without the use of chemical or other development processes.

It is another object of the invention to provide a method and apparatus for producing images rapidly and economically.

It is another object to provide an instantaneous camera with greater light sensitivity than that provided by the usual photographic film.

It is still another object of the invention to provide a camera capable of the immediate production of multiple copies of the same image.

These and other objects of the invention will be apparent from the following description of a preferred embodiment of the invention considered together with the following drawings, in which:

FIG. 1 is a block diagram of a camera embodying the invention; and

FIG. 2 is a diagrammatic representation of an alternative embodiment of the invention.

A conventional lens system 2, equipped with any desired shutter, exposure, and focusing arrangement, is arranged to project an image on the surface of a solid state array imaging device 4, which may be a CCD (charge-coupled device) having a planar array of light sensitive elements. The device 4 delivers a series of pulses, each of which has an amplitude that is a function of the light-induced charge on a small discrete area on the surface of the device 4, which is coupled through a conventional amplifier 6 to an analog-to-digital converter 8.

The digital signals from the converter 8 are stored in a CCD shift register memory 10. The data from the memory are fed into a mechanical scanning printer 12 capable of printing one or more discrete dots or lines in response to each of said digital signals to produce directly a visible reproduction 14 of the image projected onto the surface of the array imaging device 4.

The operation of the various sections of the camera is controlled by conventional electronic circuits 17, which may be arranged to synchronize the operation of the shutter in the lens assembly 2.

The array imaging device 4 may be a conventional CCD equipped with known scanning circuits whereby pulses are produced in sequential form, each pulse having an amplitude that is a function of the light incident at one predetermined area of the device 4 so that the entire sequence of pulses represents the distribution and intensity of the light falling on the surface of the device 4. Such devices are well known and are described, for example, in an article entitled "Charge-Coupled Devices" in the February 1974 issue of Scientific American.

Other forms of solid state imaging devices may be used, such as a CID (charge-injection device), the construction and operation of which is well known in the art.

The retention time of the charge induced on the imaging array by the projection of an image thereon is a function of the dark current in the device, and in a typical CCD is of the order of one-half second. If the printer is capable of producing an entire image within the retention period of the imaging array, the analog-to-digital converter 8 and the memory 10 can be eliminated and the printer 12 coupled directly to the imaging device 4. However, the construction of a high speed printer or a CCD with a substantially lower dark current adds to the cost of the system, thereby obviating one of the advantages. The preferred system is therefore to provide a memory 10 having a retention time sufficient to permit the use of a lower speed, and therefore more economical, printer. The printer may be one capable of printing dots on low cost paper. For example, one using a heat-sensitive paper, such as the ones coated with white pigmented wax (or wax otherwise treated to render it opaque) over a dark background paper, permits control of the dot size either by controlling the length of time the heat is applied to the surface or by controlling the power applied to the marking element, to produce a half tone effect in the image. The cost of the paper, and therefore the cost per image, is substantially less than that of any photographic paper or light sensitive film.

An alternative type of printing is one using paper having either a voltage or current sensitive coating which may be arranged to move at constant speed across a rotating drum having a projecting spiral marking element.

The camera described here has unique advantages when the retention time of the memory significantly exceeds the time to produce an image on the printer. Such an arrangement permits multiple prints of the image stored in the memory without re-exposing the imaging device 4. For example, the operator can examine a completed print and decide whether additional prints are required. If he wishes one or more additional images, he merely requests additional read-outs from the memory 10.

As pointed out above, there are, under certain conditions, advantages in using an imaging array 4 with the capability of increased retention time. The dark current can be substantially reduced, and the retention time correspondingly increased, by operating the imaging device 4 at a reduced temperature. The imaging device may, for example as shown in FIG. 2, be supported within an evacuated housing 18 and in thermal contact with a cooling device 20 which may, by way of example, be a thermoelectric cooler. The housing 18 is provided with a transparent wall, as at 22, or other means for permitting the image to be projected onto the surface of the device 4. It should be noted that with sufficient cooling the CID type of device may be read out repeatedly and non-destructively to produce multiple copies of the same image.

The resolution of the camera is dependent upon the number of light sensitive areas in the imaging device 4, but even a relatively low resolution image has many useful applications. When greater resolution is desired, imaging devices with greater numbers of light sensing areas must be employed.

This type of electronic camera has an additional advantage over conventional photography in that the solid state devices presently available have a higher quantum efficiency than film, and have significantly better low light performance than can be achieved with photographic film.

From the foregoing it will be seen that my invention is well adapted to attain the ends and objects herein set forth and to be economically manufactured and practical in application.

I claim:

1. An instantaneous camera comprising a lens system; a solid state array imaging device having discrete light sensitive points whose accumulated charge is a function of the incident light; means for positioning said imaging device in predetermined relationship with said lens system; means for sensing charges at said points and generating in predetermined order a sequence of pulses whose amplitudes are a function of the respective instantaneous charges at said points; a printer responsive to said pulses and having means for direct production of visible marks; and means coupling said last-said means to said printer.

2. A camera as described in claim 1 including means maintaining the said imaging device substantially below ambient temperature.

3. A camera as described in claim 1 wherein said coupling means includes an analog-to-digital converter and a solid state memory device whereby said pulses are stored as digital data for a time sufficient to permit effective recording of said data by said printer.

4. A camera as described in claim 3 wherein said memory has a retention time significantly in excess of the printing time of said printer for one complete image.

* * * * *

REEXAMINATION CERTIFICATE (2178th)
United States Patent [19]
Barrett

[11] B1 4,074,324
[45] Certificate Issued Jan. 11, 1994

[54] INSTANT ELECTRONIC CAMERA

[76] Inventor: Jon S. Barrett, 715 Dona St., Sunnyvale, Calif. 94087

Reexamination Request:
No. 90/002,187, Oct. 31, 1990

Reexamination Certificate for:
Patent No.: 4,074,324
Issued: Feb. 14, 1978
Appl. No.: 595,628
Filed: Jul. 14, 1975

[51] Int. Cl.$^5$ ............................................. H04N 1/04
[52] U.S. Cl. ................................. 358/296; 358/401; 358/444; 358/471; 358/479; 358/908; 358/909
[58] Field of Search ............... 358/401, 444, 445, 471, 358/479, 482, 483, 908, 296

[56] References Cited

U.S. PATENT DOCUMENTS

| | | | |
|---|---|---|---|
| 3,950,608 | 2/1974 | Noda et al. | 358/401 |
| 3,962,569 | 6/1976 | Loshbourgh et al. | 364/466 |
| 3,987,474 | 1/1975 | Walker | 365/114 |
| 4,057,830 | 6/1972 | Adcock | 353/906 |
| 4,130,834 | 12/1974 | Mender et al. | 358/401 |

OTHER PUBLICATIONS

Fields, "Solid-State Camera Uses Photodiodes", *Electronics*, pp. 121 and 123, Feb. 1, 1973.
Wu, "Document Reader and Printer", *IBM Technical Disclosure Bulletin*, vol. 16 No. 11, pp. 3568-3569, Apr. 1974.
Sequin et al., "A Charge-Coupled Area Image Sensor and Frame Store", *IEEE Transactions on Electron Devices*, pp. 244-252, vol. ED-20, No. 3, Mar. 1973.
Melen, "The Tradepffs in Monolithic Image Sensors: MOS vs CCD", *Electronics*, pp. 106-111, May 24, 1973.
Compton, "The Solid State Imaging Revolution", *Electro-Optical Systems Design*, pp. 22-31, Apr. 1974.
Phillips, "A Kind of Direct Mail", *Engineering*, pp. 293-296, Apr. 1975.
Computer Design, p. 50, Jun. 1973.
Hilburn et al., *Microcomputers/Microprocessors: Hardware, Software, and Applications*, pp. 196-209, Prentice-Hall, Inc., 1977.

*Primary Examiner*—Edward L. Coles, Sr.

[57] ABSTRACT

A conventional lens system projects an image on a planar array of light sensitive elements of a charge coupled device from which digital signals containing the picture information are produced and stored for reproduction by a mechanical printer.

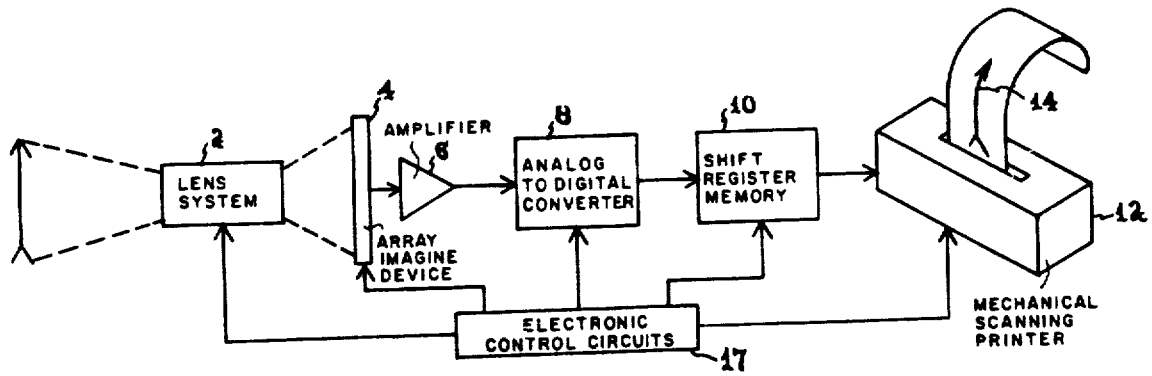

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 3-4 is confirmed.

Claims 1 and 2 are cancelled.

* * * * *